United States Patent [19]

Mirzaoff et al.

[11] Patent Number: 5,227,840
[45] Date of Patent: Jul. 13, 1993

[54] AUTOMATED PHOTOGRAPHIC CONTACT PRINTING SYSTEM

[75] Inventors: Alexander D. Mirzaoff, Webster; Julie K. Ligtenberg, Rochester, both of N.Y.

[73] Assignee: Eastman Kodak Company, Rochester, N.Y.

[21] Appl. No.: 709,545

[22] Filed: Jun. 3, 1991

[51] Int. Cl.[5] .............................................. G03B 27/80
[52] U.S. Cl. ..................................................... 355/83
[58] Field of Search ...................... 355/83, 91, 84, 81, 355/88, 113, 115

[56] References Cited

U.S. PATENT DOCUMENTS

| | | | |
|---|---|---|---|
| 4,161,363 | 7/1979 | Kahle | 355/68 |
| 4,318,613 | 3/1982 | Waiwood | 355/68 |
| 4,526,463 | 7/1985 | Hickey et al. | 355/83 |
| 4,641,200 | 2/1987 | Shoji et al. | 355/229 |
| 4,949,122 | 8/1990 | Jones et al. | 355/84 |

OTHER PUBLICATIONS

EP,A,0023709 *(The Perkin-Elmer Corporation) Feb. 11, 1981.

Primary Examiner—D. Rutledge
Attorney, Agent, or Firm—Dennis R. Arndt

[57] ABSTRACT

A photographic contact printing system comprises a data base in which certain exposure parameters (e.g., spectral response, sensitivity, dot-growth factor, nominal exposure value and overlay factor) of a variety of different photosensitive recording elements are stored. Upon selection of any one of such recording elements by a printer operator, a microprocessor automatically controls an exposure source (e.g. an electrically energizable lamp) to provide a pre-programmed exposure of the selected recording element. During exposure of the recording element, a logic and control unit receives a time-varying signal representing the instantaneous spectral radiance of the exposure source. The LCU integrates the exposure produced by the source until the integrated exposure matches a nominal (or an adjusted nominal) value, at which time the exposure is terminated. Preferably, the LCU is programmed to produce an adjusted nominal exposure value based on various exposure-affecting inputs made by the printer operator, including percent dot (or line) change, source power level, number and density of overlays and filters, percent diffusion, etc. As a result of the invention, the process of determining proper exposure for a plurality of photosensitive recording elements under a variety of exposure conditions is greatly simplified.

6 Claims, 6 Drawing Sheets

AUTOMATED PHOTOGRAPHIC CONTACT PRINTING SYSTEM

BACKGROUND OF THE INVENTION

The present invention relates to the field of graphic arts. More particularly, it relates to an improved photographic contact printing system in which the task of achieving a desired exposure of a photosensitive recording element is greatly simplified.

In the field of graphic arts, it is common to use a contact printing process to produce images, such as half-tone and line-art images, on photographic films and papers. In such a process, an original document, usually in the form of a transparency, is contiguously arranged with respect to a sheet of photosensitive material, typically a photographic film. The latter is exposed through the original to produce a developable image of the original on the photosensitive sheet. In achieving a desired image density on the photosensitive sheet, several variables come into play. They include, of course, the speed and spectral characteristics of the photosensitive recording element, as well as the spectral radiance of the light source which, in the case of conventional metal-halide and tungsten-filament lamps, varies dramatically with time. Also important in the production of half-tone and line-art images are the dot-growth and overlay factors of the recording media. As is well known, different films and papers (and there are many) have considerably different characteristics which affect the exposure they require and the results they provide.

In determining the proper exposure for a particular recording medium, it is common for the graphic artist to run a series of experiments in which a film strip is exposed at several different exposure times. Upon processing the film, the artist determines from the various density levels of the developed image, which exposure time is best suited to achieve the desired results. Usually, the optimum exposure requires an interpolation process in which the artist estimates the optimum exposure time from two images which straddle the the desired density level. Each time a different film is used, this experimental process of determining optimum exposure time is repeated, ad nauseam.

SUMMARY OF THE INVENTION

Now in accordance with the present invention, the aforementioned trial-and-error approach to exposure time determination is greatly simplified by the provision of a photographic contact printing system which automatically provides an optimum (nominal) exposure for any one of a variety of different recording elements based on information pre-programmed into a data base associated with the system. Upon initiating an exposure of a selected photosensitive medium, a logic and control unit (e.g. a microprocessor) receives a time-varying signal representing the instantaneous spectral radiance of an exposure source. The logic and control unit integrates the exposure provided by the source until the integrated exposure matches a pre-programmed nominal (or adjusted nominal) value for the selected photosensitive medium, at which time the exposure is terminated.

According to a preferred embodiment, a photographic contact printing system includes the following elements:

(a) means for storing information representing respective spectral sensitivities and nominal exposure values of each of a plurality of different photosensitive recording elements;

(b) means for adjusting said nominal exposure values to reflect changes in system parameters which would alter a desired exposure of a selected photosensitive recording element;

(c) a light source responsive to applied electrical energy to expose a photosensitive recording element through an original to produce a latent image of the original on the photosensitive recording element, such light source having a spectral radiance that changes with time;

(d) means for sensing the instantaneous spectral radiance of the light source and for producing an output indicative thereof; and (e) logic and control means operatively coupled to the storing and sensing means for controlling the energization of the light source to achieve a desired exposure of a selected photosensitive recording element, such logic and control means functioning to (i) integrate the effective exposure received by such selected photosensitive recording element upon energization of the light source, taking into account the changing spectral radiance of the light source and the stored spectral sensitivity of the selected photosensitive recording element, to provide a continuously increasing effective exposure value, and (ii) de-energize the light source when the increasing effective exposure value substantially equals a preselected and stored exposure value for the selected photosensitive recording element.

Preferably, the above-noted logic and control means is adapted to compute an adjusted nominal exposure value based on various exposure-affecting inputs made by the system operator, including percent dot or line change (when making half-tone or line-art images), source power level, number and density of overlays and filters, percent diffusion, etc.

As a result of the invention, the process of determining proper exposure for a plurality of photosensitive recording elements under a variety of exposure conditions is greatly simplified.

The invention will be better understood from the ensuing detailed description of preferred embodiments, reference being made to the accompanying drawings.

DETAILED DESCRIPTION OF PREFERRED EMBODIMENTS

Figure 1:
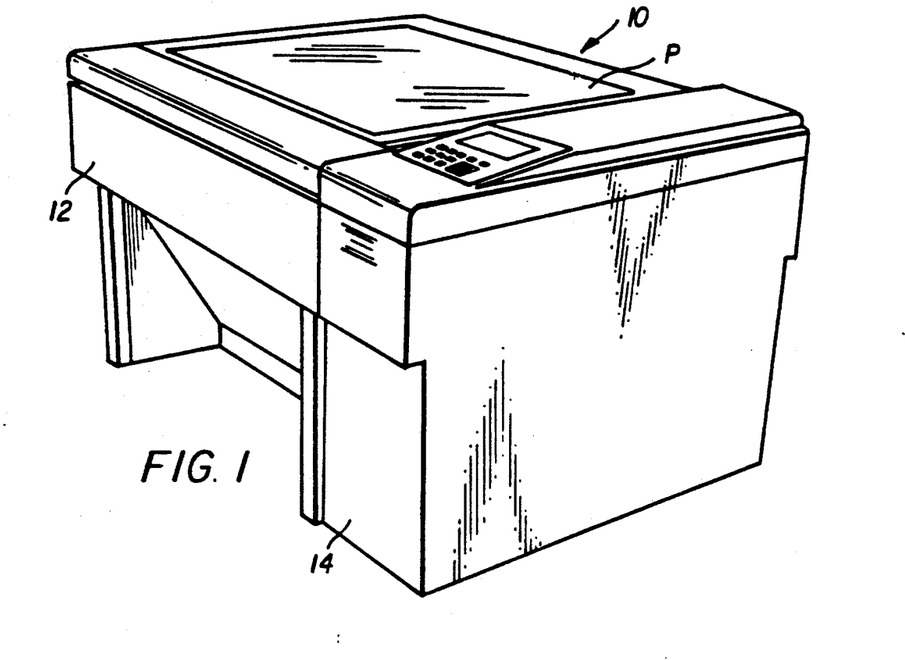
FIG. 1 is a perspective illustration of a photographic contact printer embodying the present invention.
Figure 2:
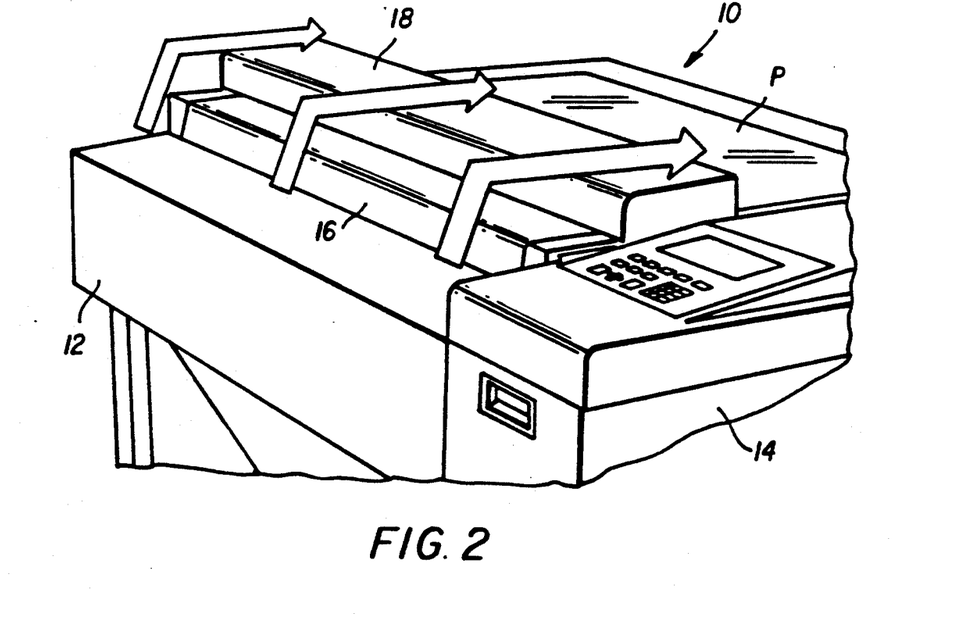
FIG. 2 is an enlarged view of a portion of the FIG. 1 apparatus.

Referring now to the drawings, FIGS. 1 and 2 illustrate a photographic contact printing system 10 embodying the present invention. System 10 comprises a contact exposure section 12 and an exposure control section 14. The contact exposure section includes a transparent vacuum platen P which is adapted to support an original and a photosensitive recording element (e.g. photographic film) in superposed relationship. A fixed relationship between the original and recording element is maintained by an opaque vacuum blanket 16 which is normally contained in a wound-up condition in a movable housing 18. Just prior to exposure, housing 18 is moved in the direction of the arrows (FIG. 2), causing the blanket to unwind and overlay the orginal and film. A negative pressure (i.e., a vacuum) is then applied through tiny apertures in the platen to draw down the blanket upon the original and film, thereby maintaining the film in contiguous contact with the original (or with an overlay disposed therebetween). A light source L (shown in FIG. 3) is then energized for a time interval sufficient to expose the recording element through the original and thereby record an image of the original on the recording element. The structural details of the contact printer are unnecessary in understanding the present invention. However, for a more complete disclosure of a contact printer of the type described, reference is made to the commonly assigned U.S. Pat. No. 4,949,122, issued in the names of R. S. Jones and J. J. Maurer.

Figure 3:
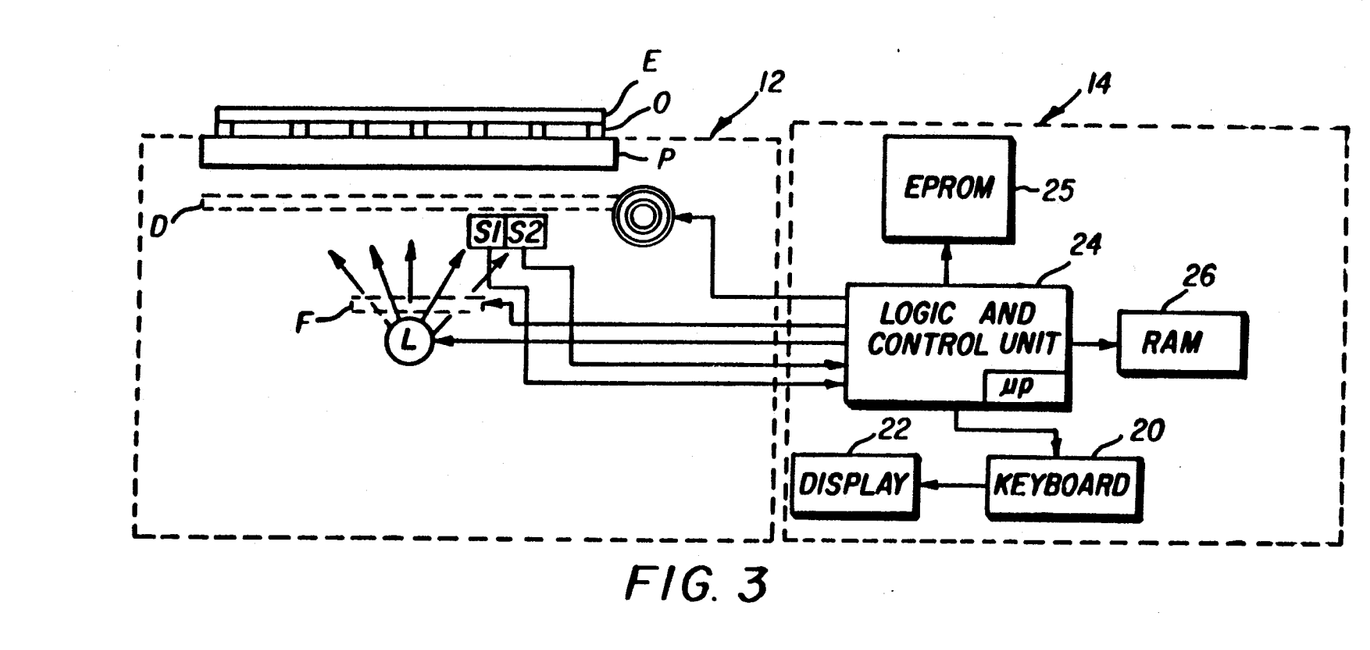
FIG. 3 is a schematic diagram of a contact printer embodying the invention.

Now in accordance with the preferred embodiment of the present invention, the exposure control unit of printer 10 comprises a keyboard 20 and a display panel 22. As shown in FIG. 3, both of these elements are operatively coupled to a logic and control unit (LCU) 24 which includes a standard microprocessor uP. The latter, as explained below, operates on certain stored information, as well as on inputs derived from a pair of photoelectric sensors S1, S2 within the exposure section, to precisely control the exposure of any one of a plurality of recording elements selected by the system operator. At least a portion of the stored information is contained in an eraseable, programmable read-only memory (EPROM) which is operatively coupled to the LCU, as shown. The EPROM is programmed, preferably by the system manufacturer, to store certain characteristics of a variety of different photosensitive recording elements of the type normally used in the printer system. Such characteristics include the spectral sensitivity (combined spectral response and speed) of each of such films, and a nominal exposure value which is to be used under certain predefined nominal conditions. Preferably, the EPROM also has stored therein certain other useful exposure-affecting parameters, including dot-growth factor (for half-tone imaging) and overlay factor (used when a neutral density overlay between the original and recording element.

Another portion of the stored information acted upon by the LCU is contained in a random-access-memory (RAM) 26. Such information can be entered by the system operator and contains, for example, the desired percent change in dot size, the number of overlays, the precent line spread and choke, percent diffusion, etc. All such information has an effect on the optimum exposure level of a particular film, and the LCU takes this information into account in controlling the exposure of the recording element.

Still referring to FIG. 3, it will be seen that the exposure section 12 of the contact printing system includes an eletrically energizable lamp L, such as a conventional metal-halide or tungsten filament lamp, and one or more filters F which, on command of the LCU, are movable into and out of the optical path between the lamp and the exposure platen. Also, the exposure section includes a diffusion screen which, on command by the LCU, can be unrolled from a roll R and positioned between the lamp and exposure platen for any portion of an exposure interval. Energization, as well as de-energization, of lamp L is controlled by the LCU. Upon being energized, the lamp's spectral radiance undergoes rapid changes which affects the amount of exposure received by the recording element E through the original O. Unless monitored and compensated for during exposure, accurate exposures cannot be reasonably expected To account for the above-noted changes in the lamp's spectral radiance, the aforementioned photoelectric sensors S1 and S2 are positioned to be illuminated by lamp output. By means of suitable bandpass filters or the like, sensors S1 and S2 operate to sense the lamp radiance within two different spectral regions, e.g., the ultraviolet (u.v.) region, and the blue region. Each sensor is adapted to provide a time-varying output voltage proportional to the level of light received. The respective sensor output signals are fed to the LCU which, in accordance with the algorithm expressed below, uses this information to terminate exposure (e.g. by de-energizing the lamp) at the appropriate time to achieve a predetermined exposure of a preselected recording element.

Figure 5:
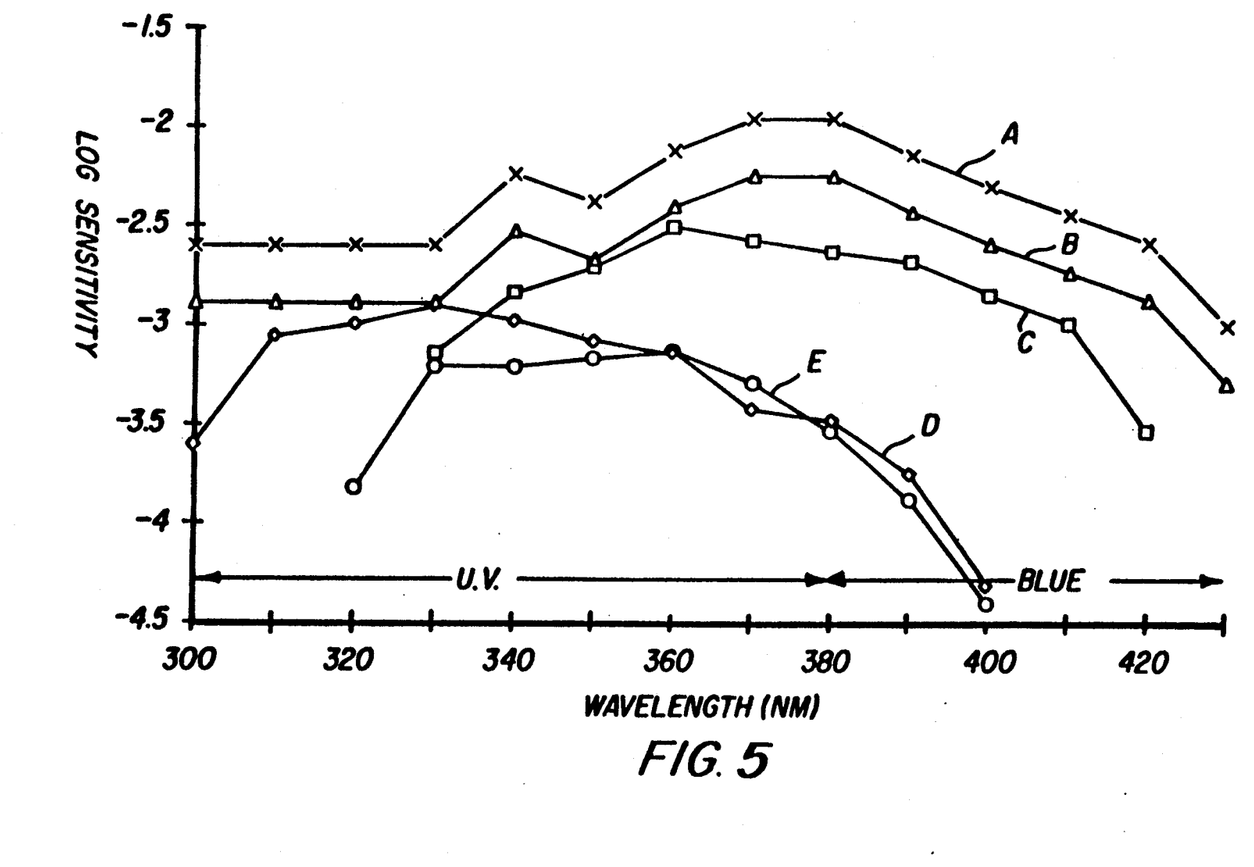
FIG. 5 are graphs illustrating the spectral sensitivities of various photosensitive record elements.
Figure 6:
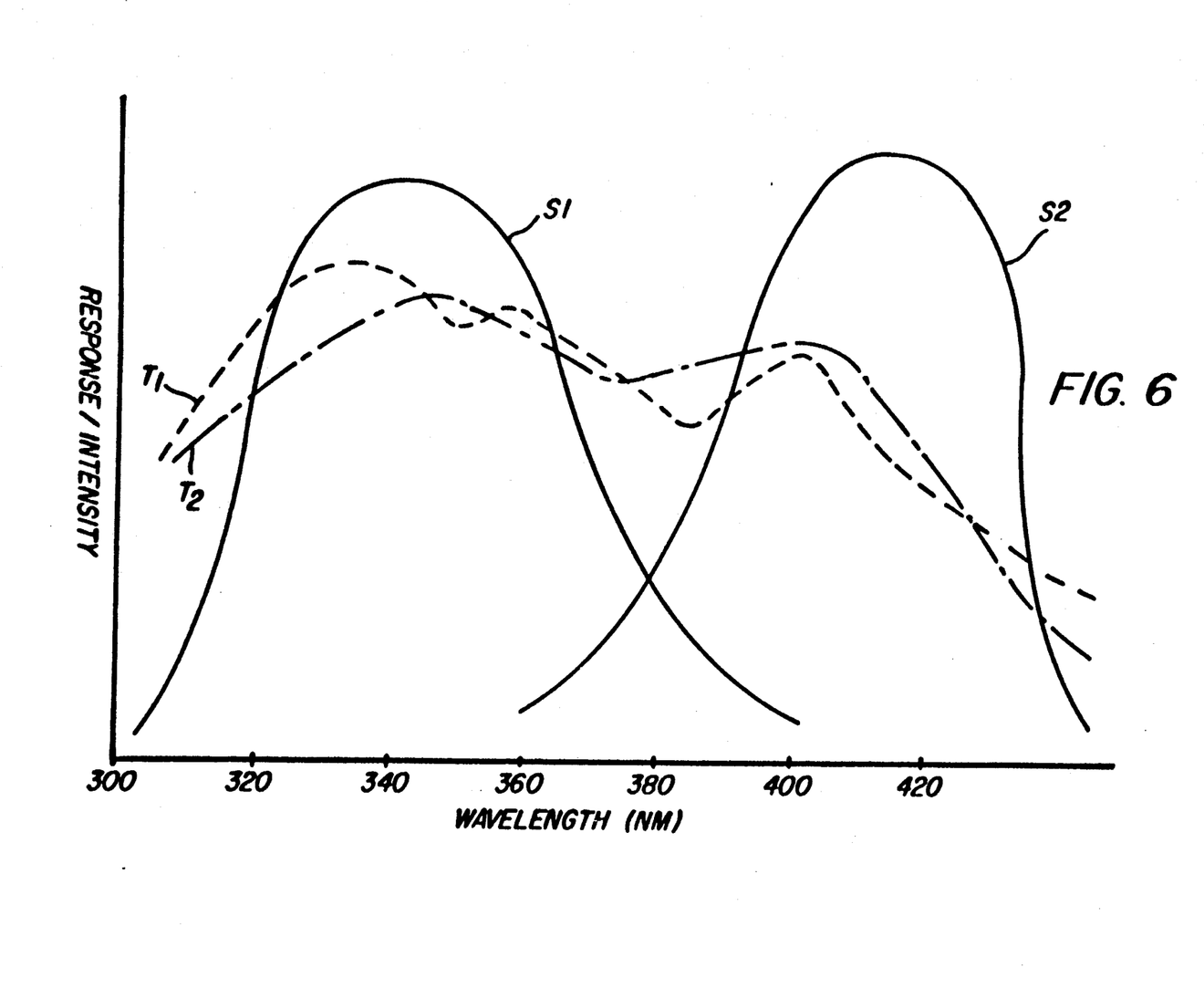
FIG. 6 are graphs illustrating a typical spectral radiance of a light source used in a contact printing system.

In FIG. 5, the respective spectral sensitivities of five different photographic films A-E are illustrated. While some films are nearly as sensitive in the blue spectral region as they are in the u.v., others are considerably less responsive to blue light than to u.v. light. This difference in spectral sensitivity must be taken into account in property exposing a selected film. Similarly, referring to FIG. 6, the lamp's-rapidly changing spectral radiance $R_L$, shown at two different times, $T_1$ and $T_2$, and the respective spectral responses of sensors S1 and S2, must be factored into any exposure calculation.

Figure 4:
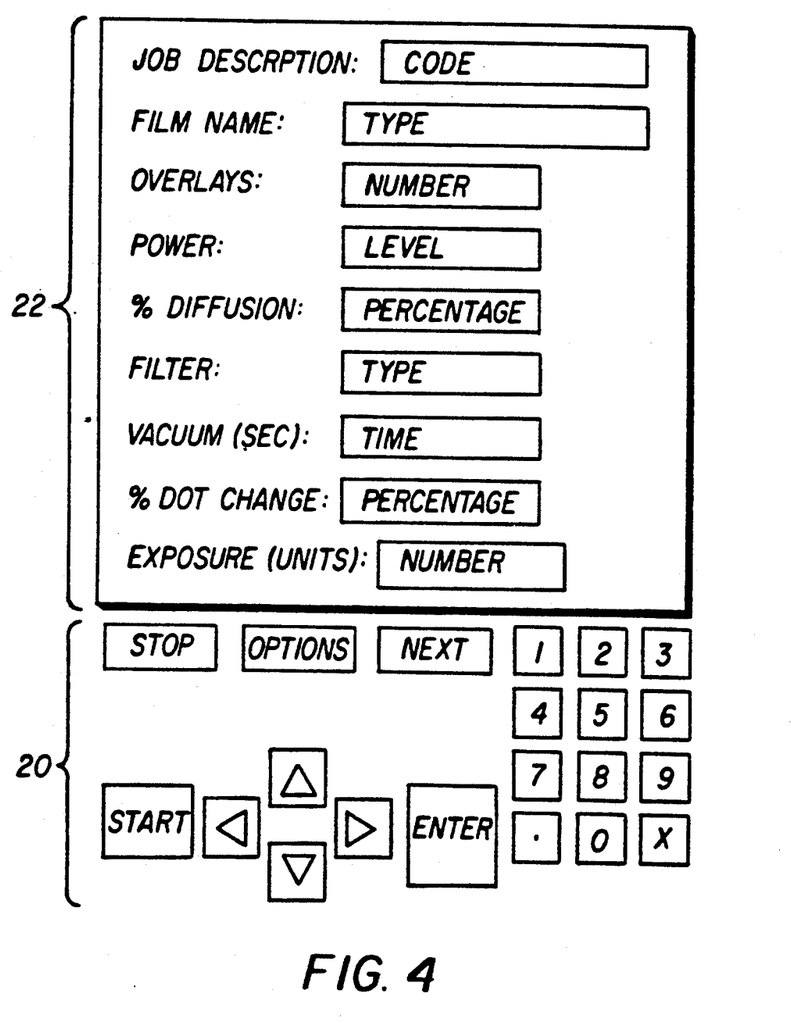
FIG. 4 illustrates the details of the display and keyboard components of the FIG. 3 apparatus.

As noted above, the exposure control section of printer 10 includes a keyboard 20, best shown in FIG. 4, through which the operator may make certain entries in RAM 26 and interact with the LCU. The display 22 serves to provide a visual indication of the type of recording element being exposed, the number of overlays, the lamp power (e.g., full or half-power), etc. Also displayed is the percent dot change and a nominal exposure value. All these variables may be preset and displayed for a particular "job description". Thus, in using the system, the operator selects a particular job description by entering, via keyboard 20, the appropriate code. the display indicates the type of film normally used for that job and, at least, the nominal exposure for that job. The exposure value may be adjusted, if desired, by moving a cursor on the display screen to the displayed value and striking over such value with a new value. If desired, the old and new values may be displayed. The exposure process is initiated by striking the "start" button, whereupon the exposure blanket covers the film and original. After a vacuum is applied for a preset time. the exposure lamp is energized. During the exposure interval, the LCU operates to detect the exposure being received by the selected recording element and to discontinue the exposure when the programmed exposure value has been reached. In doing so, the LCU operates as follows:

First, the exposure source (lamp) intensity in the u.v. spectral region, $I_{uv}$, is determined by the equation, $I_{uv} = C_1 V_{S1} + C_2 V_{S2}$, where $V_{S1}$ is the output voltage of the u.v. sensor; $V_{S2}$ is the output voltage of the blue sensor; $C_1$ is an empirically determined proportionality constant based on the spectral responsivity of the u.v. sensor to u.v. radiation; and $C_2$ is a proportionality constant relating the responsivity of the u.v. sensor to blue light. In the same manner, the lamp intentity in the blue spectral region is determined by the equation, $I_{blue} = C_3 V_{S1} + C_4 V_{S2}$, where $C_3$ is a proportionality constant relating the responsivity of the blue sensor to u.v. radiation, and $C_4$ is a proportionality constant relating the responsivity of the blue sensor to blue light. From these equations, the effectiveness of the lamp, $E_{eff}$, in exposing a selected photosensitive recording element (film) is $E_{eff} = R_{uv} I_{uv} + R_{blue} I_{blue}$, where $R_{uv}$ and $R_{blue}$ are the relative spectral responses (measured in percent) of the selected film to u.v. and blue light, respectively. Values for $C_1$-$C_4$ are stored in the EPROM, as are the spectral responses and relative film speeds of all of the selectable recording elements.

Figure 7:
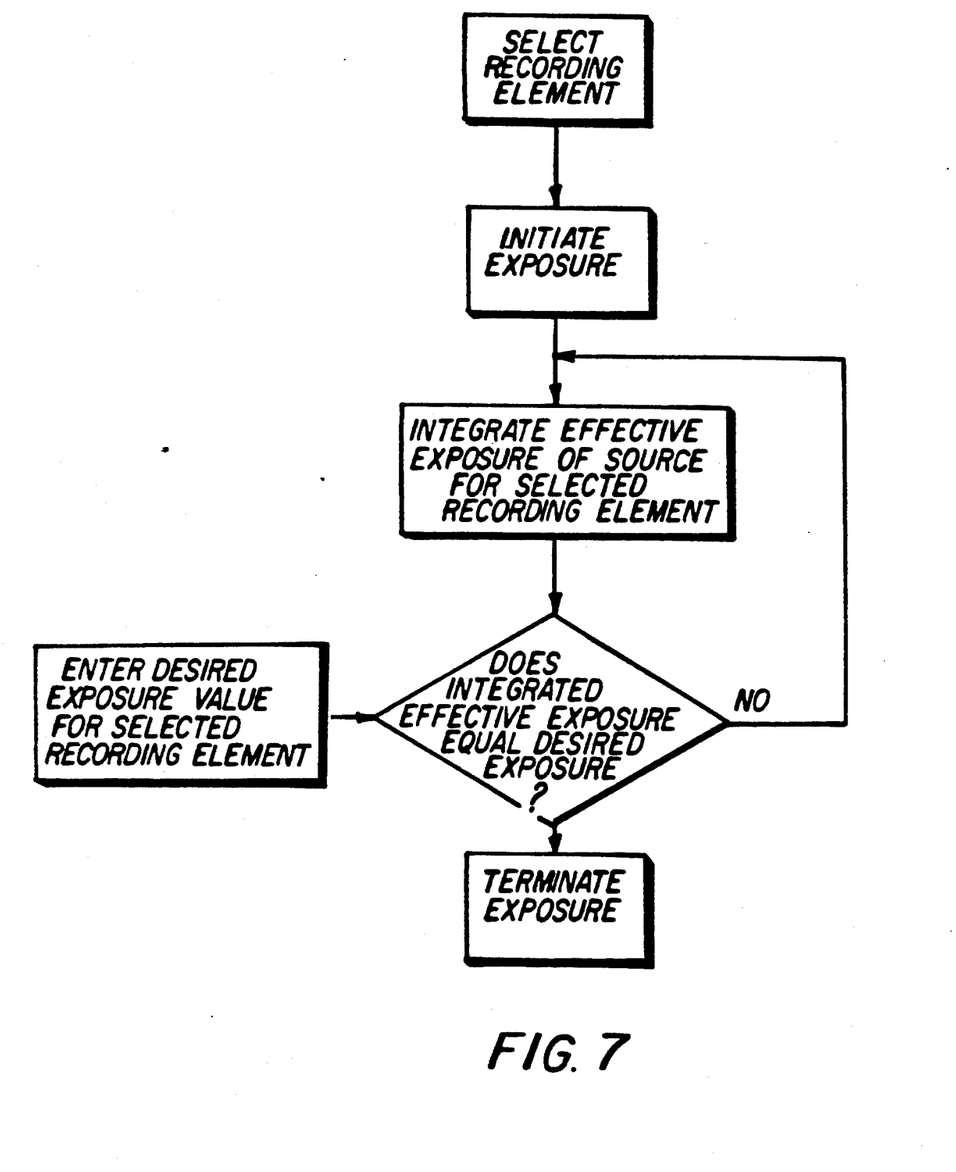
FIG. 7 is a flow chart depicting a process performed by the logic and control unit of FIG. 3 in providing a desired exposure period.

Having determined the lamp's effective spectral output, $E_{eff}$, it is apparent that the effective exposure received by the film over each time increment, dt, may be expressed as $E_{eff} dt$, and the total effective exposure received by the film may be expressed as, $\Sigma E_{eff} S dt$, where S is a measure of the relative film speed or sensitivity. During an exposure, the LCU continuously integrates the incremental exposure provided by the lamp and, when the integrated exposure value matches or exceeds the pre-programmed nominal (or adjusted nominal value for the selected film), the LCU terminates the exposure. A flow chart representing the process performed by the LCU in determining the actual exposure received by the recording element is shown in FIG. 7.

In addition to controlling the exposure based on film sensitivity and lamp output, the LCU can also take into account the effect of using overlays, filters and diffusion screens. In half-tone printing, it is often desirable to make some slight adjustment to dot size, and such adjustment is achieved by increasing or decreasing the exposure E, according to the equation, $$E(\text{adjusted}) = 10^{A/B} E(\text{initial})$$

where A is the desired percent dot-change and B is the dot-growth factor for the particular recording element.

In the above calculation, the dot growth factor for each recording element is stored in the EPROM, and the percent dot change is entered into RAM 26 by the system operator. Both are accessed by the LCU as needed and acted upon by the microprocessor to provide the adjusted exposure value used, in the above-noted algorithm to terminate exposure at the appropriate time.

The invention has been described with particular reference to a preferred embodiment. It will be appreciated, however, that obvious changes may be made without departing from the spirit of the invention. Such changes are intended to fall within the scope of the appended claims.

What is claimed is:

1. A contact printer for producing an image of an original on a photosensitive medium, said photosensitive medium having a predetermined spectral response and sensitivity, said printer comprising:

(a) means for supporting the photosensitive medium and original in superposed relationship;
    (b) a light source for exposing the photosensitive medium through the original to produce a latent image of the original on the photosensitive medium, said light source having a spectral radiance that varies with time;
    (c) means for sensing the instantaneous spectral radiance of said light source and for producing an output indicative thereof;
    (d) means for storing information representing a nominal exposure value for said photosensitive medium;
    (e) logic and control means operatively connected to said storing means and responsive to the output of said sensing means for controlling the exposure of the photosensitive medium by said light source based on the relationship between the stored information and the spectral radiance of said light source.

2. The apparatus as defined by claim 1 wherein said light source comprises an electrically energizable lamp, and wherein said logic and control means operates to control the time during which said lamp is electrically energized by continuously integrating the exposure provided by said lamp and comparing it with said nominal exposure value.

3. A contact printer for producing an image of a half-tone or line art original on a photosensitive medium, said half-tone original comprising a transparency composed of a plurality of spaced dots or lines having an opacity which differs from the surrounding area, said printer comprising:

(a) means for supporting the photosensitive medium and original in superposed and contiguous relationship;
    (b) a light source for exposing the photosensitive medium through the original to thereby produce a latent image of the original on the photosensitive medium;
    (c) means for producing a signal representing a desired percentage change in the size of each dot or the width of each line imaged on the photosensitive medium relative to the size or width of the corresponding dot or line, respectively, on the original; and
    (d) logic and control means responsive to said signal for controlling the exposure of said photosensitive medium to said light source to effect said desired percentage change in dot size or line width.

4. A contact printer for producing an image of an original on one of a plurality of different photosensitive recording elements, each of such recording elements having a spectral response and/or sensitivity different than the others of such recording elements, said printer comprising:

(a) means for storing information representing the respective spectral responses and sensitivities of each of a plurality of different photosensitive recording elements;
    (b) a light source responsive to applied electrical energy to expose a photosensitive recording element through an original to produce a latent image of the original on the photosensitive recording element, said light source having a spectral radiance that varies with time;

(c) means for sensing the instantaneous spectral radiance of said light source and for producing a time-varying output signal indicative thereof;

(d) means for selecting various exposure parameters which affect the amount of light received by said recording element from said light source during an exposure period; and (e) logic and control means for controlling the time interval during which the photosensitive recording element is exposed to said light source, said logic and control means being operatively coupled to said storing, sensing and selecting means and operating to control said time interval based on said stored information, the spectral radiance of said light source, and said selected exposure parameters.

5. A contact printer for producing an image of a half-tone original on one of a plurality of different photosensitive recording elements, each of such recording elements having a spectral response and/or sensitivity different than the other of such recording elements, said half-tone original comprising a transparency composed of a plurality of spaced dots having an opacity which differs from the surrounding area, said printer comprising:

(a) means for storing information representing the respective spectral responses and sensitivities of each of a plurality of different photosensitive recording elements;

(b) a light source responsive to applied electrical energy to expose a photosensitive recording element through an original to produce a latent image of the original on the photosensitive recording element, said light source having a spectral radiance that varies with time;

(c) means for sensing the instantaneous spectral radiance of said light source and for producing a first control signal indicative thereof;

(d) means for producing a second control signal representing a desired percentage change in the size of each dot imaged on the photosensitive recording element relative to the size of the corresponding dot on the original; and (e) logic and control means responsive to said first and second control signals for electrically energizing said light source for a time interval based on a desired dot size change and the relationship between the spectral radiance of said light source and the spectral response and sensitivity of a selected recording element.

6. A photographic contact printer comprising:

(a) means for storing information representing respective spectral sensitivities and nominal exposure values of each of a plurality of different photosensitive recording elements;

(b) means for adjusting said nominal exposure values to reflect changes in system parameters which would alter a desired exposure of a selected photosensitive recording element;

(c) a light source responsive to applied electrical energy to expose a photosensitive recording element through an original to produce a latent image of the original on the photosensitive recording element, said light source having a spectral radiance that changes with time;

(d) means for sensing the instantaneous spectral radiance of the light source and for producing an output indicative thereof; and (e) logic and control means operatively coupled to the storing and sensing means for controlling the energization of the light source to achieve a desired exposure of a selected photosensitive recording element, said logic and control means functioning to (i) integrate the effective exposure received by such selected photosensitive recording element upon energization of the light source, taking into account the changing spectral radiance of the light source and the stored spectral sensitivity of the selected photosensitive recording element, to provide a continuously increasing effective exposure value, and (ii) de-energize the light source when the increasing effective exposure value substantially equals a preselected and stored exposure value for the selected photosensitive recording element.

* * * * *